United States Patent [19]

Gulyas et al.

[11] 3,775,095

[45] Nov. 27, 1973

[54] REMOVAL OF DUST PARTICLES FROM A DUST LADEN STREAM OF GASES EXITING FROM A MULTIPLE HEARTH FURNACE AND REINJECTION OF DUST PARTICLES INTO THE FURNACE

[75] Inventors: James W. Gulyas, Fort Saskatchewan, Alberta, Canada; Patrick T. O'Kane, Dasmarinas, Philippines

[73] Assignee: Sherritt Gordon Mines Limited, Toronto, Ontario, Canada

[22] Filed: June 17, 1971

[21] Appl. No.: 153,954

[30] Foreign Application Priority Data
May 3, 1971 Canada.................................. 111923

[52] U.S. Cl......................................... 75/82, 75/25
[51] Int. Cl............................................. C22b 23/00
[58] Field of Search ....................... 75/25, 82, 7, 34, 75/67; 266/15, 16, 17

[56] References Cited
UNITED STATES PATENTS

| | | | |
|---|---|---|---|
| 1,929,308 | 10/1933 | Clarke............................ | 266/15 X |
| 2,000,972 | 5/1935 | Manross......................... | 266/16 X |
| 2,089,306 | 8/1937 | Stimmel et al................... | 266/16 X |
| 1,024,623 | 4/1912 | Dougherty...................... | 75/25 X |
| 1,713,435 | 5/1929 | Heskamp........................ | 75/25 |
| 2,000,171 | 5/1935 | Gronningsaeter................ | 75/82 |
| 2,090,388 | 8/1937 | Hardiek.......................... | 75/7 X |
| 2,128,379 | 8/1938 | Spencer.......................... | 75/25 X |

OTHER PUBLICATIONS

Roldt et al.; The Winning of Nickel; D. VanNostrand Co.; Princeton, N.J.; 1967; pages 259, 260, 358, 418, 426, 428, 429.

*Primary Examiner*—L. Dewayne Rutledge
*Assistant Examiner*—M. J. Andrews
*Attorney*—James T. Wilbur et al.

[57] ABSTRACT

Ore is fed into the top of a multiple hearth furnace and, as it travels downwardly through the furnace, it is reduction roasted by means of a rising stream of hot reducing gases. Fine ore particles picked up by the combustion gases within the furnace and exiting therewith are removed from the gases and reinjected into the furnace at a point at which the degree of reduction of the particles approximates the degree of reduction of the ore which passes downwardly at the point. To prevent the injected particles from being carried upwardly by the partial combustion gases, the particles are injected in the form of a continuous plug.

3 Claims, 1 Drawing Figure

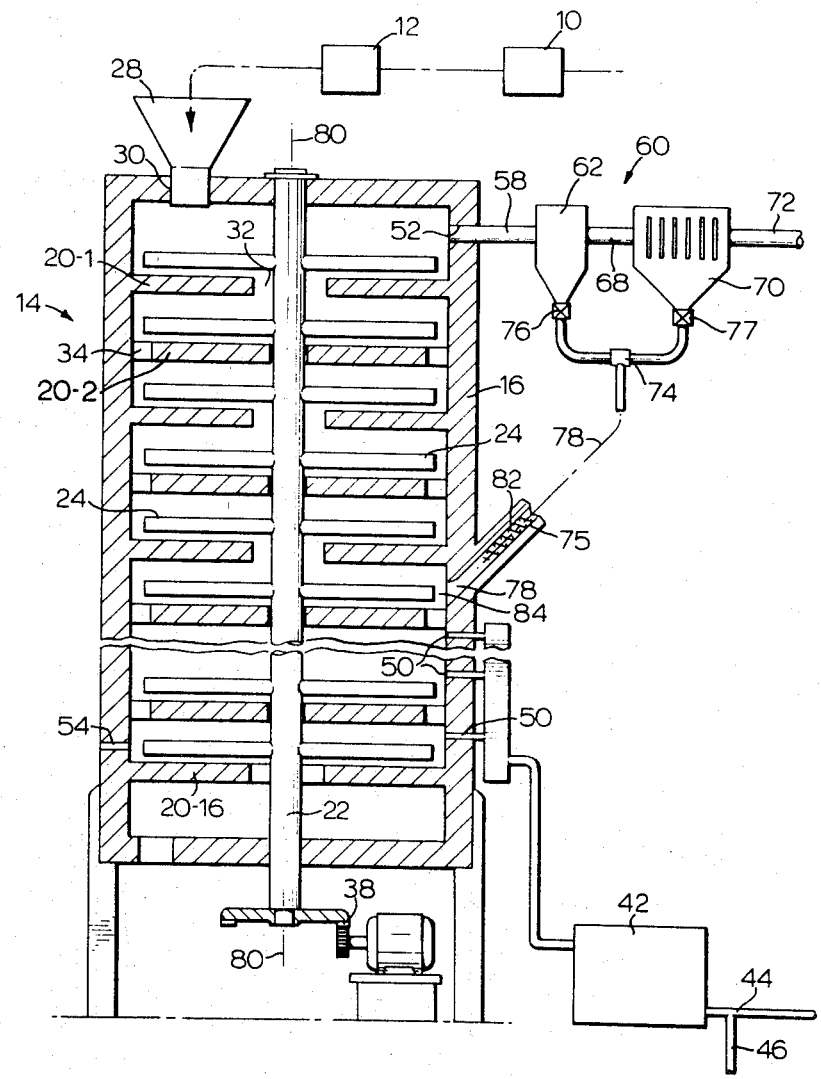

REMOVAL OF DUST PARTICLES FROM A DUST LADEN STREAM OF GASES EXITING FROM A MULTIPLE HEARTH FURNACE AND REINJECTION OF DUST PARTICLES INTO THE FURNACE

This invention relates to the reduction of nickeliferous, lateritic and garnieritic ores to enable selective extraction of contained nickel and cobalt values therefrom by leaching with an aqueous ammoniacal solution. More particularly, the invention is concerned with an improvement in the roasting operation of such ores in which dust particles are separated from furnace exhaust gases and reinjected into the furnace.

A large proportion of the world's nickel resources are contained in oxidic and siliceous ores such as limonite, garnierite and serpentine. The following Table illustrates the normal range of composition of each of these types of ores:

TABLE 1

|  | Serpentine (garnierite) ore % by weight | Limonite ore % by weight |
| --- | --- | --- |
| Ni | 1.0-4.0 | 0.10-3.0 |
| Co | 0.05-0.08 | 0.05-0.25 |
| Fe | 8-18 | 35.0-60.0 |
| Cr | 0.8-2 | 1-3 |
| MgO | 20-38 | 0.2-6.0 |
| $Al_2O_3$ | 1-6 | 0.4-10 |
| $SiO_2$ | 40-35 | 1.3-6 |
| CaO | 0.1-2 | 0.06-0.1 |
| MnO | 0.1-1 | 0.3-2.5 |

The recovery of nickel and cobalt from these materials presents serious problems to the metallurgical industry. The problems result primarily from the fact that ores of this type contain relatively small amounts of nickel and cobalt. It is necessary to treat large quantities of ore for the recovery of the relatively small amounts of contained values. Conventional, relatively inexpensive ore beneficiation methods are not suitable for concentration of the nickel and cobalt values.

One process commercially employed for the recovery of nickel and cobalt values from lateritic and garnieritic ores involves comminuting the ore to substantially 100 percent minus 65 mesh standard Tyler screen then roasting the ore in a multiple hearth furnace to effect substantially complete reduction of contained nickel and cobalt values of a metallic form with a minimum reduction of iron to a metallic state. The reduced ore is then leached with an aqueous ammoniacal ammonium carbonate solution in the presence of free oxygen to extract metallic nickel and cobalt values and dissolve them in the leach solution as nickel and cobalt ammine carbonate. Undissolved residue is separated from the leach solution and the solution is treated for the recovery of dissolved nickel and cobalt values.

The multiple hearth furnace provides the physical opportunity for the comminuted ore to contact hot combustion gases together with reducing gases such as hydrogen and carbon monoxide. Upon entering the furnace, the ore passes downwardly through a preheat zone in which it is heated to the temperature required for reduction by the combustion and reducing gases which travel upwardly and countercurrently to the ore. Generally, the temperature required for reduction is within the range of about 550°C. to 870°C. After the ore reaches the reducing temperature, it passes through a lower reduction zone in which it contacts and is reduced by hydrogen and other gaseous reductants in the gases. The reduced ore is then discharged from the furnace through an exit port at the bottom of the furnace.

Complete reduction of the ore requires the presence of a large volume of hot reducing gases within the furnace. These gases have a large carrying capacity for ore particles and as a result, many of the particles fed into the top of the furnace, instead of travelling downwardly, are picked up immediately by the rising stream of gases and exit from the furnace therewith. Adequate residence time of the ore in a furnace is essential to complete reduction of the ore and measures must be taken to ensure that the ore travels downwardly in the furnace. The reducing gases within the furnace are capable of supporting individual ore particles of −65 mesh in size and therefore potentially every ore particle fed into the furnace will be carried upwardly in the rising stream. In fact, only when the particles are fed into the furnace one at a time will they all be picked up by the gas stream. When the ore particles enter the furnace as a contiguous stream, a smaller quantity of particles will be carried upwardly in the gas stream. In general, only a small portion of particles larger than 10 microns will be carried upwardly by the rising stream of gases. The bulk of the particles carried upwardly will be finer than 10 microns. For convenience these particles are referred to as "dust particles." Since most lateritic ore particles fed to the furnace are smaller than 5 microns in size, the quantity of particles carried upwardly is substantial. As the particles travel downwardly in the furnace however, the likelihood that the dust particles will be picked up by the gases grows less because the velocity of the gases steadily decreases in a downward direction from the top of the furnace.

The recovery of nickel from the ore fed to the furnace will, of course, be adversely affected by large dust losses. Moreover, the reduction roasting operation is greatly complicated by the presence of substantial amounts of dust particles in the gases exiting from the furnace. To minimize air pollution, and to permit reuse of the unspent reducing gases discharged from the furnace, dust collection apparatus must be provided to separate the dust from the gases.

Various studies have been made of methods of dealing with dust separated from the furnace exit gases. The dust may be simply discarded. If the dust is discarded, not only will nickel and cobalt values in the dust particles be lost but dust collection and disposal facilities must be provided. Such facilities contribute significantly to the overall cost of the reduction roasting operation. Alternatively, the dust may be returned to the furnace. According to one known operation, the dust is reinjected into the uppermost hearth of the furnace. This practice tends to set up a recirculating load of dust thereby increasing the quantity of dust in the exit gases and decreasing the capacity of the roaster.

The principal object of the present invention is to provide an improvement to the process in which nickel and cobalt bearing lateritic and garnieritic ores are reduction roasted in a furnace by means of hot reducing gases travelling countercurrent to the ores. The improvement involves collecting dust particles exhausted with the reducing gases from the furnace and reinjecting these particles into the furnace whereby the amount of reduced ore discharged from the furnace is substantially increased and hence the amount of nickel and cobalt recovered from the feed ore is substantially increased.

It is another object to provide a process in which the dust separated from the reducing gases exhausted from the furnace is re-cycled to the furnace whereby substantially all dust particles pass downwardly and are reduced in the furnace. The reduced dust particles discharge from the furnace with larger ore particles and nickel and cobalt values contained in the dust particles may be extracted therefrom.

It is a further object to provide a process for dealing with dust particles which process does not require dust collection, storage and disposal facilities capable of handling large quantities of dust.

Broadly, the present invention may be considered to be an improvement in the method of roasting comminuted nickel bearing lateritic and garnieritic ores to effect heating and reduction thereof wherein the ore is introduced into the top of a multiple hearth furnace, passes downwardly and counter-currently to a rising stream of hot reducing gases and discharges from the bottom of the furnace, the gases travelling upwardly at an increasing velocity and, together with any particles of ore carried upwardly in said stream of gases, exiting upwardly of the furnace. The improvement in the method involves separating the exiting particles of ore from the stream of gases and injecting the particles into the furnace as a continuous plug such that substantially all injected particles pass downwardly in the furnace and discharge from the bottom thereof. The injected particles are introduced into the furnace at a point at which the degree of reduction of the particles approximates the degree of reduction of the ore which passes downwardly at the point.

According to an alternative aspect, the invention comprises the combination of a multiple hearth furnace having a lower zone into which hot partial combustion gases are introduced, an upper zone from which the gases are expelled, an inlet at the top of the furnace through which the ore to be roasted is introduced, an outlet at the bottom from which roasted ore is discharged, the feed ore travelling downwardly and countercurrently to the combustion gases; dust collection apparatus located outside the furnace and through which gases expelled from the furnace pass, said apparatus serving to remove fine ore particles carried outwardly of the furnace by the partial combustion gases; and means for reinjecting the fine ore particles into the furnace as a continuous plug.

The invention is described in detail with reference to the accompanying drawing in which the apparatus of the invention is illustrated schematically.

The ore is first dried by a rotary dryer 10 to reduce the moisture content of the ore to below about 5 percent by weight. The drying step is important in order to enable control of the water vapour content of the furnace atmosphere in the subsequent reduction step. The amount of water vapour present during the reduction step is of importance and must be controlled in order to ensure minimum reduction of iron values in the ore to soluble form.

The dry ore is comminuted to substantially 85 percent − 200 mesh and 98 percent − 65 mesh Standard Tyler screen in ball mill 12. The ground ore may also be pelletized by conventional pelletizing procedures to increase the bulk density and to decrease the amount of dust which must be treated.

The ore is charged into furnace 14. The illustrated furnace is a Herrshoff multiple hearth furnace which consists of a cylindrical shell 16 within which 16 circular hearths 20 − 1 to 20 − 16 are disposed in vertically spaced decks. A vertical central rotating shaft 22 running through the centre of the brick arches carries rabble arms 24 having a plurality of downwardly extending teeth. Four rabble arms are disposed about each hearth and upon rotation of the central shaft, the teeth serve to rake the ore across the hearth.

A hopper 28 is secured to the furnace at the top. Ore is fed to the hopper and passes downwardly through drop hole 30 to the periphery of hearth 20 − 1. The charge is raked inwardly along the hearth to drop hole 32 where it falls downwardly to hearth 20 − 2. The ore is raked outwardly along the hearth and falls through drop hole 34 and so on down.

Shaft 22 is rotated by a bevel gear 38 at the bottom, the rate of rotation of the shaft is determined largely by the required capacity of the furnace or the depth of ore on the hearths.

Combustion chamber 42 is fired by fuel which passes through conduit 44 and is vapourized and mixed with air which passes through conduit 46. Hot gases evolved from the combustion of the fuel are conducted to the furnace through a plurality of conduits 50 vertically spaced about the lower eight hearths of the furnace. Upon entering the furnace, the gases travel upwardly and heat the downwardly moving ore. The gas exits through port 52.

Fuel may be natural gas or fuel oil such as Bunker C oil. The amount of air mixed with the fuel is restricted so that the fuel burns incompletely and gaseous reductants including hydrogen and carbon monoxide are evolved. The content of reducing gases in the combustion gases may be controlled by adjustment of the amount of oxygen supplied to the combustion chamber. The quantity of reducing gases introduced into the furnace may be augmented by an additional source of reducing gases produced by steam reforming of hydrocarbons with removal of carbon dioxide. The additional reducing gases may be introduced through conduits 50 or they may be injected through a port 54 directly into the furnace.

Gas which passes upwardly through the furnace exits through conduit 58 which extends laterally from the upper zone of the furnace. The gas contains combustion gases, water vapour and unspent reducing gases. Dust particles carried upwardly with the reducing gases also exit through conduit 58. The ore particles in the gas stream are recovered in dust collection apparatus generally designated by the numeral 60. The apparatus includes a cyclone separator 62 into which the dust laden gases pass directly from conduit 58. The coarse particles of generally +325 mesh Standard Tyler screen are removed from the gas stream and the gases from which the coarse particles have been removed pass through conduit 68 into an electrostatic precipitator 70 in which fine particles of −325 mesh to about 5 microns are removed. The gas from precipitator 70 exits through line 72 to apparatus for recovering unspent reducing gases (not illustrated) thence to an exhaust stack.

Particles removed from the gas stream by the cyclone separator and electrostatic precipitator fall through T-joint 74 to a chute 75. Valves 76 and 77 beneath separator 62 and precipitator 70 respectively are provided so that the quantity of material passing through the chute may be controlled. The longitudinal axis 78—78 of the chute is inclined at an angle of approximately 45° to the longitudinal axis 80—80 of the shaft 22. A screw conveyor 82 mounted within the chute moves dust through the chute at a predetermined rate and injects the dust into the furnace through inlet 84. The ore particles discharged into the furnace from the screw conveyor are in the form of a continuous plug.

It is important that the dust particles remain in contact with reducing gas from the time when the particles are removed from the stream of gases exiting from the furnace to the time when they are reinjected into the furnace. Contact with oxidizing or even neutralizing gases during this period causes a change in the mineralogy of the particles and renders the nickel values largely unextractable in the subsequent leaching operation. To ensure that the dust particles remain under reducing conditions, no air should be permitted to enter the dust collection, the dust reinjection apparatus and the conduits through which the dust particles pass. The only gas which the particles contact during their passage from the furnace exhaust to the reinjection apparatus should be the gas which exits from the furnace. As previously noted, this gas contains hydrogen and other reducing gases.

The temperature of the gas contacted by the dust particles must be maintained above its dew point. Since the exhaust gases from the furnace contain in excess of 40 percent water by volume, substantial amounts of moisture will condense if the temperature of the gas falls below its dew point. Such moisture will turn the dust into a cake which cannot be moved by the screw conveyor. Usually the temperature of the exhaust gases is sufficiently high that no auxiliary heat need be supplied to maintain the temperature of the dust within the dust collection and reinjection apparatus above the dew point. In some cases however, it may be necessary to insulate the apparatus or even to place steam or other thermal jackets about the apparatus and conduits to ensure that the temperature of the gases does not fall below the dew point.

The dust particles are injected into the furnace at a point at which the degrees of reduction of reduceable metal values in the injected particles and in the ore passing downwardly at the injection point are approximately the same. That is to say, the degree of reduction of the reduceables in the dust particles governs the point of injection. The principal reduceable metal values in lateritic and garnieritic feed ore are nickel, cobalt, iron and magnesium. The nickel, cobalt and magnesium values are in complex oxidic form in the ore and the conditions within the furnace are adjusted to reduce these values to a crude metallic state in the furnace. The iron values are largely in the form of iron oxide (FeO·OH) and the furnace conditions are controlled to effect maximum conversion of these values to magnetite.

The conversion of iron values to magnetite is believed to occur largely in the upper zone of a furnace while the downward travelling ore is being preheated to the temperature required for reduction. When the ore reaches the lower zone of the furnace, its temperature is between 550°C. and 870°C. and reduction of nickel, cobalt and magnesium values are believed to occur.

The reduceable nickel, cobalt, iron and magnesium values in the dust particles are only partially reduced before exiting from the furnace. The degree of reduction of each of these values will vary from particle to particle. Similarly, the degree of reduction of each reduceable metal value in the ore particles falling past any given point in the furnace will vary from particle to particle. As a practical matter, it is impossible to inject the dust particles into the furnace at a point at which the degree of reduction of every reduceable metal value in each injected dust particle is identical to the degree of reduction of the ore particles in the furnace falling past the injection point. For example, the degree of reduction of reduceable values in the dust particles may vary from 10 - 20 percent iron, 20 - 25 percent nickel, 15 - 25 percent cobalt and 20 - 30 percent magnesium, the average degrees of reduction being 15% Fe, 22% Ni, 20% Co and 25% Mg. At the point within the furnace which the average degree of reduction of iron values in the falling ore is 15 percent, the nickel, cobalt and magnesium values may have only reduced 10 percent, well below the average degree of reduction of these values in the dust particles. It is found that the point of injection of the dust particles into the furnace is not critical to the operability of the present process. It is satisfactory that the average degrees of reduction of the reduceable metal values in the dust particles and in the ore in the furnace passing by the point of injection are approximately the same. Thus in the above example, the dust particles might be injected somewhat below the point at which the nickel, cobalt and magnesium values average 10 percent. They might be injected into a point at which the degree of reduction of these values is closer to 15 percent and the iron about 20 percent although the degree of reduction of the iron values in the dust particles is only 15 percent.

The actual location of the injection point will depend upon the composition of the ore and its moisture content, composition and temperature of the reducing gases, height of the furnace and other factors. The correct point must be determined experimentally but the experiments are relatively simple. Samples of ore falling downwardly at various points in the furnace may be extracted using sampling devices in conventional use for such purposes. A particularly suitable device for this purpose is described in U.S. Pat. No. 3,628,777 issued Dec. 21, 1971. The degree of reduction of reduceable metal values such as nickel, iron, cobalt and magnesium may be determined using standard wet analysis techniques such as bromine leach of metallic values in methyl alcohol.

Measures must be taken to ensure that dust particles injected into the furnace travel downwardly with the ore. Since the resistance to motion by a dust particle is directly related to its radius according to Stokes Law, the effective radius of particles injected into the furnace must be such that the resultant of resistance to upward movement together with all other forces acting downwardly on the particles is greater than the upward force exerted by the gas stream. If the dust particles are injected singly into the furnace, they will all be carried upwardly by the gases. If however, the particles are injected in the form of a continuous plug, relatively few will be carried upwardly, the majority travelling downwardly with the larger ore particles. The term "continuous plug" in the context of this application is intended to mean a continuous stream which, upon entering into the furnace, is of sufficient effective diameter to resist elevation by the gases.

The screw conveyor provides a convenient and ready means by which the rate of entry of the dust particles into the furnace may be adjusted to ensure that the particles enter the furnace as a continuous plug. By way of example, if the injected particles are carried upwardly by the gases, the conveyor must be rotated more slowly to allow more dust particles to enter the device before it is conveyed to the furnace. The direction of travel of the dust particles can be readily ascertained by monitoring the weight of dust injected into the furnace over a period of time. If the weight remains constant, injected dust particles must be travelling downward. If the weight increases, the recirculating dust load must be increasing and hence the injected dust particles must be travelling upward. In such an event, the speed of the screw conveyor must be increased to keep pace with the increased dust load and to prevent plugging.

It will be understood, of course, that modifications can be made in the preferred embodiment of the invention described and illustrated herein without departing from the scope and purview of the invention as defined by the appended claims.

What we claim as new and desire to protect by Letters Patent of the United States is:

1. In the method of roasting comminuted nickel-bearing lateritic and garnieritic ores to effect heating and reduction thereof wherein the ore is introduced into the top of a multiple hearth furnace, passes downwardly and counter-currently to a rising stream of hot reducing gases and discharges from the bottom of the furnace, the gases travelling upwardly at increasing velocity and, together with particles of ore in said stream of gases, exiting upwardly of said furnace, the improvement characterized in that the exiting particles of ore are separated from the exiting stream of gases and, while keeping the particles in contact with reducing gas maintained at a temperature above its dew point, the particles are passed to an inlet and injected therethrough into the furnace as a continuous plug such that substantially all injected particles pass downwardly in said furnace and discharge from the bottom thereof, said particles being injected into the furnace at a point at which the degree of reduction of the particles approximates the degree of reduction of the ore which passes downwardly at the point.

2. In themethodof roasting comminuted nickel-bearing lateritic and garnieritic ores to effect heating and reduction of reduceable metal values therein wherein the ore is introduced into the top of a multiple hearth furnace, passes downwardly and counter-currently to a rising stream of hot reducing gases and discharges from the bottom of the furnace, the gases travelling upwardly at increasing velocity and, together with particles of ore in said stream of gases, exiting upwardly of said furnace, the improvement characterized in that the exiting particles of ore are separated from the exiting stream of gases and, while keeping the particles in contact with reducing gas maintained at a temperature above its dew point, the particles are passed to an inlet and injected therethrough into the furnace as a continuous plug such that substantially all injected particles pass downwardly in said furnace and discharge from the bottom thereof, said particles being injected into the furnace at a point at which the degree of reduction of reduceable metal values in said particles approximates the degree of reduction of reduceable metal values in the ore which passes downwardly at said point.

3. The method as claimed in claim 2, wherein said reduceable metal values are oxides of nickel, cobalt, iron and magnesium.

* * * * *